US012633805B2

(12) United States Patent
Gramann et al.

(10) Patent No.: US 12,633,805 B2
(45) Date of Patent: May 19, 2026

(54) ELECTRICAL CIRCUIT ARRANGEMENT AND ELECTRICAL DRIVE ARRANGEMENT

(71) Applicant: Schaeffler Technologies AG & Co. KG, Herzogenaurach (DE)

(72) Inventors: Nicolai Gramann, Renchen (DE);
Mihai Cretu, Kappelrodeck (DE);
Thorsten Rittgerott, Offenburg (DE);
Julian Körner, Karlsruhe (DE);
Eduard Enderle, Gengenbach (DE);
Sebastian Jackstädt, Hilden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 244 days.

(21) Appl. No.: 18/568,924

(22) PCT Filed: Jun. 10, 2022

(86) PCT No.: PCT/DE2022/100437
§ 371 (c)(1),
(2) Date: Dec. 11, 2023

(87) PCT Pub. No.: WO2022/262903
PCT Pub. Date: Dec. 22, 2022

(65) Prior Publication Data
US 2024/0291354 A1    Aug. 29, 2024

(30) Foreign Application Priority Data
Jun. 14, 2021    (DE) ..................... 10 2021 115 272.0

(51) Int. Cl.
*H02K 11/33*    (2016.01)
*H02K 5/20*    (2006.01)
*H02K 9/19*    (2006.01)

(52) U.S. Cl.
CPC ............. *H02K 11/33* (2016.01); *H02K 5/203* (2021.01); *H02K 9/19* (2013.01)

(58) Field of Classification Search
CPC ....... H02K 11/33; H02K 11/38; H02M 7/003; H02M 7/219
See application file for complete search history.

(56) References Cited

U.S. PATENT DOCUMENTS

| | | | |
|---|---|---|---|
| 9,241,428 B1 | 1/2016 | Doo | |
| 2013/0049550 A1* | 2/2013 | Watanabe | ............. F04B 39/121 310/67 R |

(Continued)

FOREIGN PATENT DOCUMENTS

| | | |
|---|---|---|
| DE | 112013006238 T5 | 10/2015 |
| DE | 202016104380 U1 | 8/2016 |

(Continued)

OTHER PUBLICATIONS

18568924_2025-09-30_KR_20130131603_A_H.pdf (Year: 2025).*

*Primary Examiner* — Maged M Almawri
*Assistant Examiner* — Ahmed F Seck
(74) *Attorney, Agent, or Firm* — Price Heneveld LLP

(57) ABSTRACT

Electrical circuit arrangement comprising a first inverter, a second inverter, and a housing having a plate section extending in an interior of the housing, wherein the plate section divides the interior of the housing into a first chamber and a second chamber. A first side of the plate section at least partially delimits the first chamber, and a second side, situated opposite the first side, of the plate section at least partially delimits the second chamber. The first inverter and the second inverter each include a power module. The power module of the first inverter is arranged on the first side of the plate section, and the power module of the second inverter is arranged on the second side of the plate section.

16 Claims, 6 Drawing Sheets

(56)            References Cited

U.S. PATENT DOCUMENTS

2017/0158042 A1 *   6/2017  Miyazawa ................ B60L 1/02
2019/0281733 A1 *   9/2019  Matsuhara ............. H02K 11/33
2020/0321836 A1 *  10/2020  Kagawa ................. H02K 11/01

FOREIGN PATENT DOCUMENTS

DE        102016208273  A1    11/2016
DE        102017218606  A1     5/2018
DE        102018202484  A1     8/2019
DE        102019217343  A1     5/2021
EP            2023473  A2     2/2009
EP            3579396  A1    12/2019
KR         20130131603  A  *  12/2013   ......... H05K 7/20272

* cited by examiner

ELECTRICAL CIRCUIT ARRANGEMENT AND ELECTRICAL DRIVE ARRANGEMENT

CROSS-REFERENCE TO RELATED APPLICATIONS

This application is the U.S. National Phase of PCT Appln. No. PCT/DE2022/100437 filed Jun. 10, 2022, which claims priority to DE 102021115272.0 filed Jun. 14, 2021, the entire disclosures of which are incorporated by reference herein.

TECHNICAL FIELD

The present disclosure relates to an electrical circuit arrangement comprising a first inverter and a second inverter. The present disclosure further relates to an electrical drive arrangement.

BACKGROUND

In motor vehicles with electrical drives, for example, power electronic circuits are used in the electrical drive trains, which comprise one or more inverters. With the inverter, when the motor vehicle is driving, a direct current, which is taken, for example, from an energy storage device designed as a traction battery, can be converted into an alternating current for operating an electrical machine. Conversely, such an inverter can also be used to rectify an alternating current generated by the electrical machine in a generator operation, so that, for example, the traction battery of the motor vehicle can be charged in a recuperation operation.

Two inverters can be used, for example, to drive two electrical machines, each of which drives a wheel on a common axle of the motor vehicle. This means that the two inverters, which are each assigned to one of the electrical machines, must be provided as part of the axle or a motor vehicle and arranged in the motor vehicle. In order to enable correct operation of the inverters, it is usually necessary for each inverter to have a cooling system and to comprise other components necessary for the operation of the inverter, such as filter circuits, control boards or similar. However, this has a disadvantageous effect on the installation space required in the interior of a motor vehicle, since with two inverters the other components are usually also present twice.

SUMMARY

The present disclosure, according to an exemplary embodiment, specifies an improved electrical circuit arrangement with two inverters, which in particular enables a more compact design and thus a space-saving arrangement of the electrical circuit.

The electrical circuit arrangement, according to the present disclosure, comprises a housing with a plate section extending in the interior of the housing, wherein the plate section divides the interior of the housing into a first chamber and a second chamber, wherein a first side of the plate section at least partially delimits the first chamber and a second side, situated opposite the first side, of the plate section at least partially delimits the second chamber, wherein the first inverter and the second inverter each comprise at least one power module and the power module of the first inverter is arranged on the first side of the plate section and the power module of the second inverter is arranged on the second side of the plate section.

The at least one power module of the first inverter arranged on the first side is thus arranged in the first chamber. Correspondingly, the at least one power module of the second inverter arranged on the second side of the plate section is arranged in the second chamber. Each of the inverters can comprise one or more power modules, wherein the power modules of the first inverter may be arranged on the first side of the plate section and the power modules of the second inverter are arranged on the second side of the plate section. A plurality of power modules can be provided, for example, if the inverters are each designed to generate and/or convert a multi-phase alternating current, wherein a power module comprising, for example, a half-bridge made up of two transistors per phase of the alternating current may be provided.

The arrangement of the power modules on the opposite sides of the plate section enables a compact arrangement of the inverters in the interior of the housing of the electrical circuit arrangement. The plate section can in particular extend centrally through the housing and divide the interior into two chambers of the same size or at least substantially the same size. The plate section can be designed as a component of the housing, which is, for example, formed in one piece with other sections of the housing or attached thereto.

The use of the plate section as a support section for the circuit elements of the inverter enables a small design of the housing. Furthermore, it is possible for the housing, in particular the plate section, to consist of an at least partially or area-specific electrically conductive material, so that a shield can also be created between the first chamber and the second chamber and thus between the first inverter and the second inverter. In this way, interference caused by the switching processes of the transistors in the power modules can be shielded from the other inverter.

The compact arrangement of the inverters in a housing is particularly advantageous when using the electrical circuit arrangement in a motor vehicle, since the overall installation space available in the interior of a motor vehicle is severely limited. In this way, the use of the electrical circuit arrangement as part of an electrical axle of a motor vehicle is advantageously simplified. The two inverters can be used in particular to operate two electrical machines, each of which is assigned to a wheel of the motor vehicle.

The arrangement of the first inverter and the second inverter in a common housing and in particular the arrangement of the power modules on the opposite sides of the plate section advantageously enable the number of further components of the electrical circuit arrangement to be reduced, as the spatially adjacent arrangement of the inverters allows the components to be used together, as described in more detail below.

Furthermore, the cooling of the inverters and in particular their power modules is simplified, since only the shared housing needs to be connected to a cooling circuit, for example the cooling circuit of a motor vehicle, in order to dissipate the heat generated in the power modules during operation of the inverters.

It is also advantageously possible for a common direct current sensor to be used for both inverters. The direct current sensor can measure a direct current supplied to or generated by the inverters. The direct current sensor can be arranged inside the housing, for example in the first chamber or in the second chamber.

According to the present disclosure, it can be provided that the plate section has at least one cooling channel extending inside the plate section. The plate section can have one or a plurality of cooling channels extending inside the plate section. The plate section can therefore be a cooling plate, which can be used to cool the components arranged on the sides of the plate section, in particular the power modules of the inverters. The cooling channel or the plurality of, in particular interconnected, sections of a cooling channel in the interior of the plate section can be connected to a cooling circuit, for example a water cooling circuit, of a motor vehicle via one or more housing-side connections. At least one inlet and at least one outlet can therefore be provided on the housing of the electrical circuit arrangement, which communicate with the at least one cooling channel in the interior of the plate section and enable the supply of a cooling medium such as cooling water or cooling air.

In embodiments, it can be provided that the power modules each have a heat sink, wherein the power modules are each arranged with the heat sink on the plate section, wherein a cooling medium can be supplied to the heat sinks via the cooling channel of the plate section. The heat sink of the power modules can, for example, have a meander or fin structure, which delimits a further cooling channel on the respective side of the plate section. For example, at least one opening can be provided in the plate section, which leads to the cooling channel running in the interior of the plate section. The heat sink of a power module can be arranged on or in this opening, so that the cooling medium can be supplied to the heat sink or to a further cooling channel delimited by the heat sink and the plate section. Depending on the design of the heat sink, it is possible for the plate section to delimit one or more additional cooling channels through which the cooling medium flows. In order to prevent the coolant from escaping, it can be provided in particular that one or more axial seals are arranged between the power module and the respective side of the plate section.

According to the present disclosure, it can be provided that the direct current sides of the first inverter and of the second inverter are connected to a capacitor arranged in the first chamber and in particular on the first side of the plate section. A capacitor arranged in the first chamber can, for example, be used as an X capacitor and be connected in parallel to the connections on the direct current side, for example a DC$^+$ and a DC$^-$ connection, of the first inverter. By connecting the direct side of the second inverter to the direct side of the first inverter or to the capacitor, it is possible that the second inverter circuit arranged in the second chamber can also use the capacitor arranged in the first chamber. It is possible that the capacitor has an increased capacity compared to a capacitor used only for an inverter. However, a second capacitor can advantageously be dispensed with since the first inverter and the second inverter can be connected to the same capacitor. As a result, the size of the electrical circuit arrangement can be advantageously reduced.

The distinction between the first chamber and the second chamber serves here to describe the arrangement of the components of the electrical circuit arrangement in the various chambers which are formed in the interior of the housing by the plate section. It is possible for the components arranged in the first chamber to also be arranged in the second chamber and vice versa. It is also possible to divide one of the components into a plurality of sub-components, for example a capacitor into two sub-capacitors. A sub-component or a sub-capacitor can be arranged in the first chamber and a further sub-component or a further sub-capacitor in the second chamber.

In order to connect a capacitor arranged in the first chamber to a direct current side of the power module of the second inverter, it can be provided, according to the present disclosure, that the capacitor is connected to the direct current side of the power module of the second inverter via at least one busbar, wherein the busbar extends through a recess in the plate section. A busbar can, for example, connect at least one direct current-side connection or at least one DC contact of the power module of the first inverter to a direct current-side connection of the power module of the second inverter, wherein the capacitor is connected, for example, to the direct current-side connections of the power module(s) of the first inverter. In this way it can be achieved that the capacitor is also connected in parallel to the direct current side of the second inverter.

In embodiments, it can be provided that the busbar is designed as a laminated busbar comprising a plurality of conductive sheets. The individual conductive sheets of the busbar are in particular insulated from one another, wherein the sheets of the busbar carry a positive and a negative potential in an alternating manner or connect the DC' and DC-connections of the inverters to one another in an alternating manner. For this purpose, the laminated, conductive sheets can each have contact tabs projecting on different sides, via which the majority of the conductive sheets of the busbar assigned to the different poles can be contacted. In this way, a low-inductance, compact design of the busbar that generates only a comparatively low interference field can be achieved.

According to the present disclosure, it can be provided that the direct current sides of the first inverter and the second inverter are connected to a filter circuit arranged in the second chamber. The filter circuit can be connected, for example, to the direct current side of the second inverter and/or a capacitor connected to the second inverter. The filter circuit can comprise one or a plurality of filter elements, which in particular filter the alternating current components at the switching frequencies of the inverters and/or their harmonics. This enables a compact design of the electrical circuit arrangement, in particular when using a capacitor arranged in the first chamber.

The filter circuit can comprise a plurality of filter components. It is also possible for the filter circuit to be arranged in the first chamber or for the filter circuit to have a plurality of filter components, wherein at least one filter component is arranged in the first chamber and at least one filter component is arranged in the second chamber.

According to the present disclosure, it can be provided that a shielding element is arranged between the filter circuit and the power module of the second inverter. The shielding element can in particular divide the second chamber into two sub-chambers, so that the filter circuit is shielded from the power module of the second inverter. In this way, the filter effect of the filter circuit can be improved. It is possible for further shielding elements to be arranged in the second chamber and/or in the first chamber, which can divide the corresponding chamber into different areas or one or more sub-chambers. For example, it is possible that a shielding element is also arranged between a capacitor arranged in the first chamber and the first inverter. The shielding element can, for example, be designed as an electrically conductive sheet, which is connected in particular to further, electrically conductive sections of the housing.

In embodiments, it can be provided that at least one first control device is arranged in the first chamber and at least one second control device is arranged in the second chamber, wherein the first control device is designed to control the first inverter and/or a component connected to the first inverter and the second control device is designed to control the second inverter and/or a component connected to the second inverter. In the context of this description, a control is also understood to mean a regulation.

A first control device can be configured or designed, for example, as a driver circuit for the first inverter. Additionally or alternatively, a first control device can also be configured or designed as a component control, which controls a component connected to the first inverter directly or indirectly via an electrical machine operated by the inverter. For example, an electrical machine operated via the first inverter can be coupled to a component designed as a transmission, wherein the transmission is connected to a first control device arranged in the first chamber and designed as a transmission control or as a hydraulic control for a transmission. This also applies analogously to the at least one second control device, which is arranged in the second chamber and is configured or designed to control the second inverter and/or a component connected to the second inverter directly or indirectly via an electrical machine operated by the second inverter.

Alternatively, it is possible for at least one common control device to be provided, which is designed or configured, for example, as a driver circuit for the inverters and/or as a control device for a plurality of components connected to the electrical machines. A common control device can be arranged in the first chamber or in the second chamber. It is also possible for a common control device to comprise at least two sub-control devices, wherein at least one sub-control device is arranged in the first chamber and at least one further sub-control device is arranged in the second chamber.

For an electrical drive arrangement according to the present disclosure, it is provided that it comprises an electrical circuit arrangement according to the present disclosure as well as a first electrical machine and a second electrical machine, wherein the first electrical machine and the second electrical machine are attached in a load-bearing manner to the housing of the electrical circuit arrangement. The first electrical machine is connected in particular to the first inverter and the second electrical machine is connected in particular to the second inverter. The electrical machines can each comprise a gear unit, e.g., a two-speed planetary gear, or be connected to such a gear unit, wherein the housing of the electrical circuit arrangement in particular also supports the gears connected to the electrical machines.

In this context, attached in a load-bearing manner means that a stationary arrangement of the entire electrical drive arrangement is possible by fastening the housing of the electrical circuit arrangement to a motor vehicle chassis, for example. The stationary arrangement of the first electrical machine and the second electrical machine as well as any further components connected thereto takes place completely or at least to a large extent via the housing of the electrical circuit arrangement.

It is possible for the first electrical machine and the second electrical machine to be arranged on opposite sides of the housing. In particular, the side on which the first electrical machine is arranged can face the first side of the plate section in the interior of the housing. Accordingly, the side on which the second electrical machine is arranged can face the second side of the plate section extending in the interior of the housing. In this way, the first electrical machine and the second electrical machine are also arranged adjacent to the first chamber and the second chamber in the interior of the housing, which also means that the electrical drive arrangement, which also results in a compact design for the electrical drive arrangement, which is designed, for example, as an electrically drivable axle of a motor vehicle.

All the advantages and configurations described above in relation to the electrical circuit arrangement according to the present disclosure apply correspondingly to the electrical drive arrangement and vice versa.

BRIEF DESCRIPTION OF THE DRAWINGS

The present disclosure is explained below on the basis of exemplary embodiments with reference to the drawings. The drawings are schematic representations, wherein.

DETAILED DESCRIPTION

Figure 1:
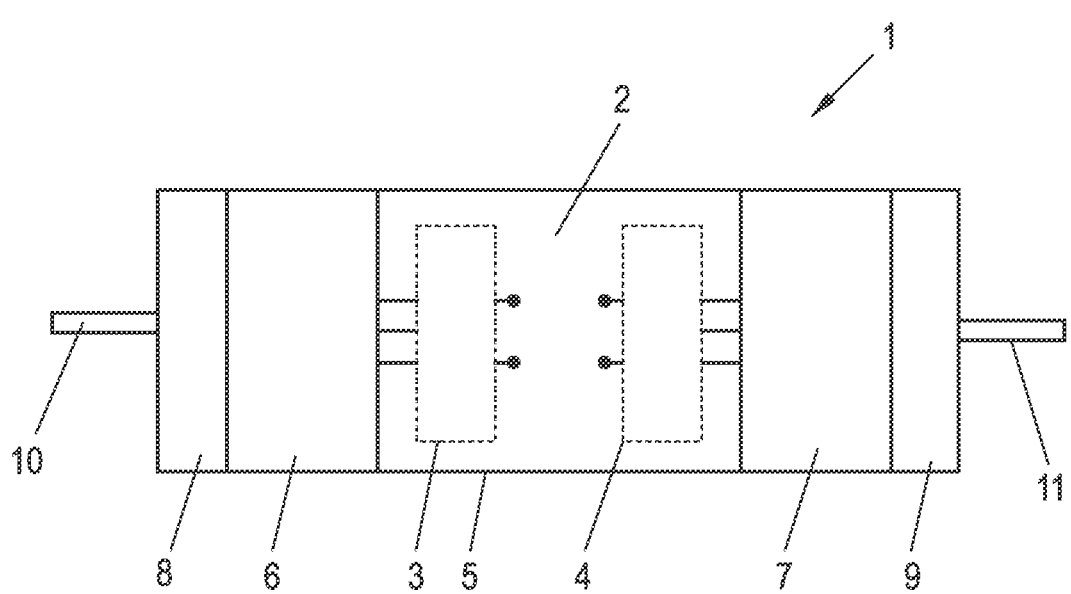
FIG. 1 shows an exemplary embodiment of an electrical drive arrangement according to the present disclosure for a motor vehicle.

FIG. 1 shows an exemplary embodiment of the design of an electrical drive arrangement 1. The electrical drive arrangement 1 comprises an electrical circuit arrangement 2, wherein the electrical circuit arrangement 2 comprises a first inverter 3 and a second inverter 4 and a housing 5. The electrical drive arrangement 1 further comprises a first electrical machine 6, which is connected to the alternating current side of the first inverter 3, and a second electrical machine 7, which is connected to the alternating current side of the second inverter 4.

In addition, the electrical drive arrangement 1 comprises a first gear unit 8 and a second gear unit 9, wherein the first gear unit 8 is coupled to the first electrical machine 6 and the second gear unit 9 is coupled to the second electrical machine 7. The gear units 8, 9 can each be designed, for example, as a two-speed planetary gear. A shaft 10, 11 is each connected to the gear units 8, 9, which, for example, can be connected to a different wheel of an axle of the motor vehicle when the electrical drive arrangement 1 is used in a motor vehicle. The electrical drive arrangement 1 represents an electrical drive axle of the motor vehicle. The electrical machines 6, 7 are attached to the housing 5 of the electrical circuit arrangement 2 in a load-bearing manner so that the entire electrical drive arrangement 1 can be arranged and fastened in a motor vehicle using the housing 5 of the circuit arrangement 2.

Figure 2:
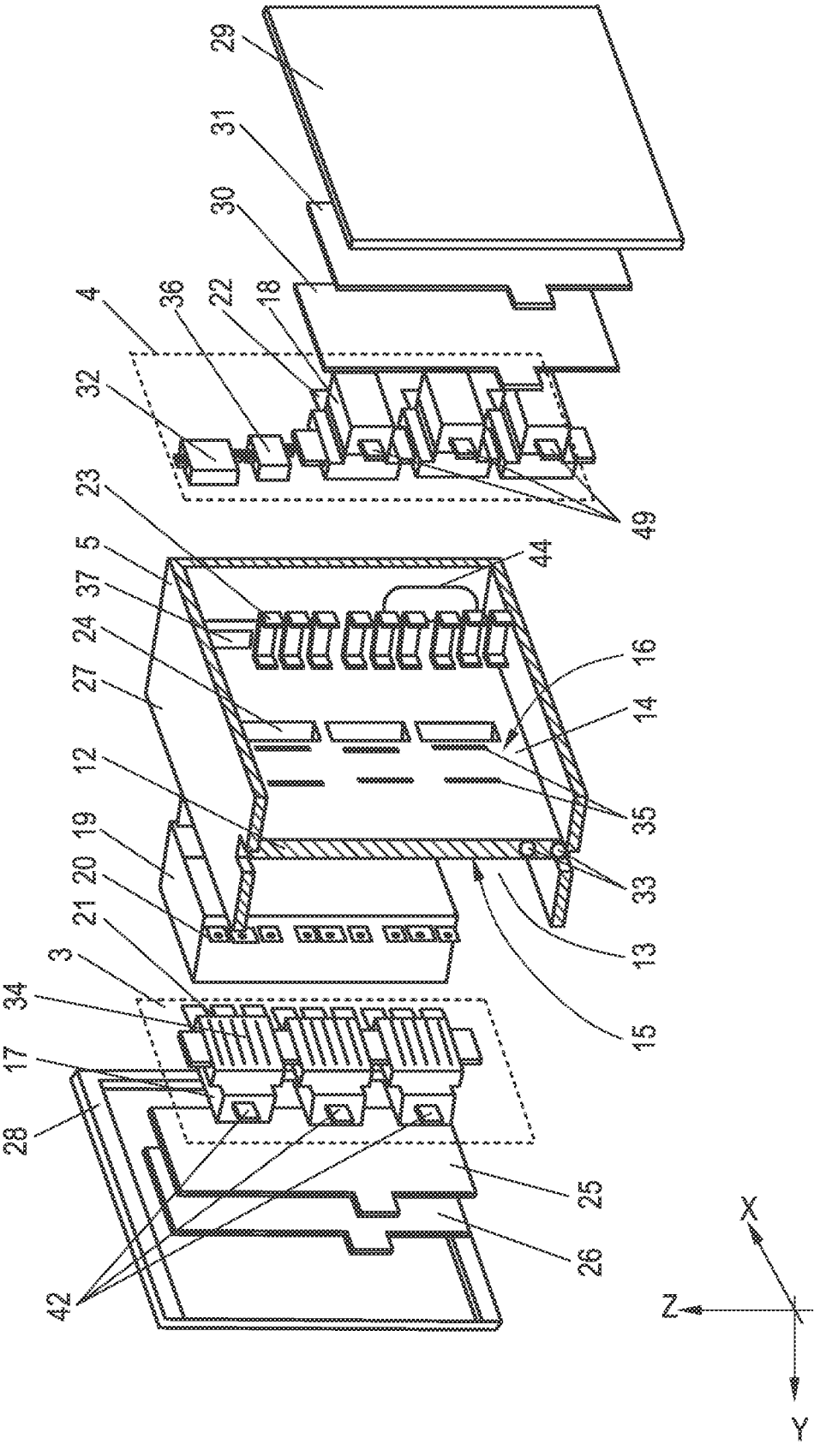
FIG. 2 shows an exploded view of an exemplary embodiment of an electrical circuit arrangement according to the present disclosure.

FIG. 2 shows an exploded view of an exemplary embodiment of an electrical circuit arrangement 2. The housing 5 comprises a plate section 12 which extends in the interior housing 5 and divides the interior of the housing 5 into a first chamber 13 and a second chamber 14. The plate section 12 has a first side 15 and a second side 16.

The power module(s) 17 of the first inverter 3 are arranged on the first side 15 of the plate section 12. In this exemplary embodiment, the first inverter 3 comprises three power modules 17, each of which comprises a half bridge formed from two transistors. Accordingly, the second inverter 4 also comprises three power modules 18, which are designed corresponding to the power modules 17 of the first inverter 3 and are arranged on the second side 16 of the plate section 12. The first inverter 3 and the second inverter 4 are each designed as a three-phase pulse inverter, for example as a B6 bridge rectifier.

A capacitor 19 is also arranged in the first chamber 13 and is connected to the direct current sides of the inverters 3 and 4. For this purpose, the connections 20 of the capacitor 19 can be connected directly to the direct current-side connections 21 of the power modules 17. The direct current-side connections 22 of the second power modules 18 can each be connected to the capacitor 19 and/or the connections 21 of the first inverter 3 via busbars 23. The busbars 23 extend through one or more openings 24 in the plate section 12, so that a connection between the capacitor 19 arranged in the first chamber 13 and the direct current side of the second inverter 4 can take place via the plate section 12.

Two first control units 25, 26 are also arranged in the first chamber 13, wherein the first control unit 25 is designed as a driver circuit for operating the first inverter 3. The further first control circuit 26 is configured or designed as a transmission control circuit, for example as a hydraulic control circuit, for operating the transmission 8 connected to the first electrical machine 6 operated via the first inverter 3. Accordingly, two second control circuits 30, 31 are arranged in the second chamber 14, wherein the second control circuit 30 is designed as a driver circuit for operating the second inverter 4. The second control circuit 31 is configured or designed as a transmission control circuit, for example as a hydraulic control circuit, for controlling the transmission 9.

A filter circuit 32 is also arranged in the second chamber 14, which is connected to the direct current sides of the first inverter 3 and the second inverter 4, for example is connected by connecting the filter circuit 32 to the busbars 23 and/or the contacts 21, 22 of the inverters 3, 4. The filter circuit 32 can be used to at least partially filter out the interference in particular caused by the switching processes in the inverters 3, 4 in order to avoid a disturbing reaction, in particular on the direct current intermediate circuit.

Furthermore, a direct current-side connection 44 and a direct current sensor 36 are arranged in the second chamber 14. The direct current-side connection 44 and the direct current sensor 36 are connected to the direct current sides of the inverters 3, 4. The direct current sensor 36 can advantageously be used jointly by both inverters, in particular by the control devices 25, 30, to operate the inverters 3, 4.

In the present exemplary embodiment, the housing 5 has a central, circumferential section 27 comprising four housing walls (shown cut in FIG. 2 on a front side of the housing 5 in order to enable a view into the interior of the housing 5). The first chamber 13 is partially delimited by the circumferential section 27, the plate section 12 and a first housing cover 28. Accordingly, the second chamber 14 of the housing 5 is delimited by the circumferential section 27, the plate section 12 and a second housing cover 29. When using the electrical circuit arrangement 2 in an electrical drive arrangement, as shown for example in FIG. 1, the first electrical machine 6 and the second electrical machine 7 can each be attached to the first housing cover 28 and the second housing cover 29 in a load-bearing manner.

The housing 5, in particular the circumferential section 27, the plate section 12 and the housing covers 28, 29 can be made of metal and in particular can be electrically conductive at least in some areas. In order to increase mechanical stability, they can have stiffening structures such as ribs, beads or similar.

The arrangement in particular of the power modules 17, 18 of the inverters 3, 4 on the plate section 12 enables a compact arrangement of the inverters 3, 4 in the interior the housing 5. In this way, a compact design of the electrical circuit arrangement 2 can be achieved. Furthermore, the plate section 12, on the first side 13 and second side 14 of which the components of the electrical circuit arrangement 2 are arranged, enables efficient cooling of these components.

Not shown in FIG. 2 is a shielding element which can be arranged between the second inverter 4 and the filter circuit 32 in the second chamber 14. The shielding element divides the second chamber 24 into two sub-chambers, wherein the second inverter 4 is in the first sub-chamber and the filter circuit 32 is in the second sub-chamber. In this way, electromagnetic shielding of the filter circuit 32 can be achieved by the second inverter 4. In particular, it is possible for one or more shielding elements to be arranged in the first chamber 13 and/or for further shielding elements to be arranged in the second chamber 14.

The plate section 12 comprises at least one cooling channel 33 running in the interior, which is designed, for example, as a bore and can be seen on the end face of the plate section 12 shown in section in FIG. 2. In this way, a cooling medium can be supplied to the plate section 12, by means of which the components arranged on the plate section 12, i.e., in particular the power modules 17, 18 of the inverters 3, 4 as well as the capacitor 19, the direct current sensor 36 and/or the filter circuit 32, can be cooled. On the exterior of the housing 5, two connections (not shown) corresponding to the cooling channel 33 can be provided, via which a cooling medium such as cooling air or cooling water can be supplied to or removed from the cooling channels 33 in the interior of the plate section 12.

In order to achieve the best possible cooling of the power modules 17, 18, the power modules 17, 18 each have a heat sink 34 on one side. The power modules 17, 18 of the first inverter 3 and the second inverter 4 are each arranged with their heat sink 34 on the plate section 12. The cooling medium can be supplied to the heat sinks 34 via the cooling channel 33 of the plate section 12—in the present case via the slot-shaped openings 35 in the first side 13 (hidden in FIG. 2) and the second side 14. The heat sinks 34 can be designed as a meander or fin structure, for example, which each delimit a further cooling channel with the first side 13 or the second side 14 of the plate section 12, wherein a cooling medium can be supplied to the further cooling channels through two of the openings 35 of the plate section 12. The heat sinks 34 or the power modules 17, 18 can be pressed against the plate section 12, for example be sealed with an axial seal to prevent unintentional leakage of the cooling medium into the interior of the housing 5. In this way, efficient cooling and a media-tight design of the housing 5 or the electrical circuit arrangement 2 are made possible.

Figures 3, 4:
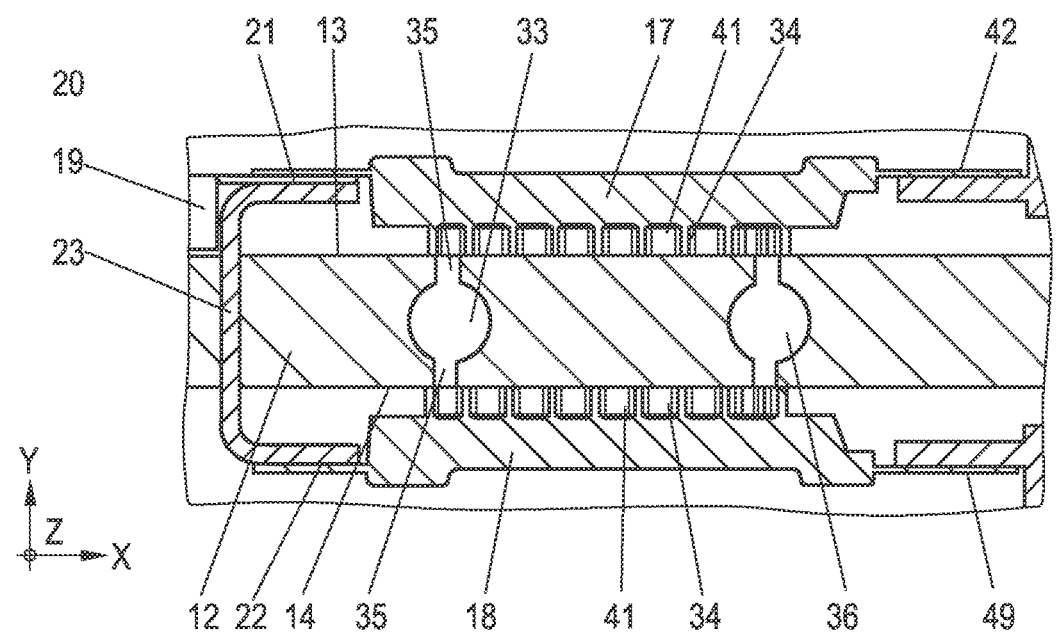
FIG. 3 shows a detailed view of a plate section of a housing of the electrical circuit arrangement.
FIG. 4 shows a sectional view through the electrical circuit arrangement.

FIG. 3 shows a detailed view of the plate section 12. The plate section 12 is shown in a plan view of the second side 14 of the plate section 12, wherein the openings 24, 35 each represent through openings, so that they are also present on the opposite, first side 13 of the plate section 12. The openings 24 accommodate the busbars 23, which connect the direct current-side contacts 21, 22 of the power modules 17, 18 to one another. The filter circuit 32 can be connected to the capacitor 19 or the first inverter 3 through a further opening 37, which is also designed as a through opening.

The cooling channel 33 running in the interior of the plate section 12 extends, for example, from an inlet 38 along an edge of the plate section 12 to a bend point. From the bend point, the cooling channel extends upwards to the opposite edge of the plate section 12 and to a further section 45 of the cooling channel 33 running there.

The area 39 shown in dashed lines is used to arrange the capacitor 19 on the first side of the plate section 13, so that it can be cooled via the plate section 12 or the cooling channel 33. The heat sinks 34 of the power modules 17, 18 shown in dashed lines are connected to the cooling channel 33 via the slot-shaped openings 35, wherein the cooling structures 34 each delimit with the first side 13 and the second side 14, respectively, of the plate section 12 at least one further cooling channel to which a cooling medium can be supplied via the cooling channel 33. For example, the cooling medium is fed to the cooling structures 34 from the right-hand slot-shaped openings 35 shown in FIG. 3 and is fed to an outlet 40 of the cooling channel 33 via the left-hand openings 35 and another section 46 of the cooling channel 33.

The arrangement of the power modules 17, 18 on the plate section 12 is shown as an example in the sectional view in FIG. 4. As can be seen, the heat sinks 34 resting on the first side 13 and the second side 14 of the plate section 12, which each have a meander or a fin structure, delimit a plurality of further cooling channels 41, to which a cooling medium can be supplied via the openings 35 from the cooling channel 13. The cooling medium is removed accordingly via the section 46 of the cooling channel 33.

FIG. 4 also shows a connection between the contacts 21 and 22 via a busbar 23. The busbar 23 can, for example, be designed as a laminated busbar and comprise a plurality of mutually insulated sheets. A positive and a negative potential, or a DC$^+$ and a DC$^-$ potential of the connections 21 and 22, can be alternately connected to one another via the mutually insulated sheets. This results in a compact and low-interference structure for the busbars 23. A connection 20 of the capacitor 19 on the direct current side of the power modules 17, 18 is also shown. The power modules 17, 18 comprise alternating current-side contacts 42 and 43, which are led out of the housing 5 and can be used to connect the inverters 3, 4 to the electrical machines 6, 7.

Figure 5:
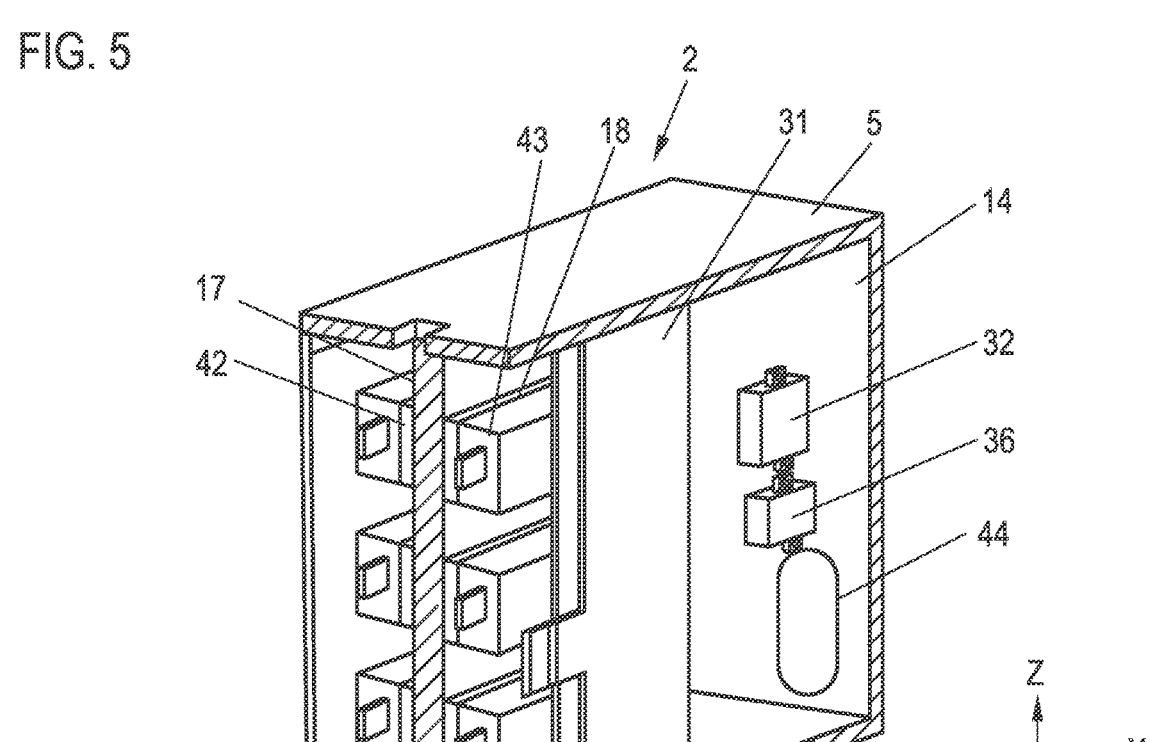
FIG. 5 shows a partially sectioned view of the second chamber of the electrical circuit arrangement.

In FIG. 5, the electrical circuit arrangement 2 is shown in the assembled state. For the sake of clarity, the housing 5 is cut on the front side and shown without the second housing cover 29, so that the interior of the housing 5 and the components arranged there, in particular in the second chamber 14, can be seen. On the front side, the alternating current-side contacts 42, 43 of the power modules 17, 18 can each be connected to one or more alternating current-side connections (not shown), which, for example, facilitates an electrical connection between the inverters 3, 4 and the electrical machines 6, 7 of an electrical drive arrangement 1.

A connection of the electrical circuit arrangement, for example to a direct current source, can also be provided on the direct current side via the connection 44. The connection 44 can be connected, for example, to the direct current sensor 36 and/or to the filter circuit 32 and via this to the capacitor 19 and the direct current sides of the inverters 3, 4. This enables the housing 5 to be connected to a direct current source: e.g., a traction battery of a motor vehicle with an electrical drive. The housing 5 can comprise further connections in order, for example, to be able to connect the first and second control circuits 25, 26, 30, 31 to further control devices and/or data communication lines or the like. The housing 5 can also have one or a plurality of inlets or outlets for supplying or removing cooling medium to or from the cooling channel 33.

Figure 6:
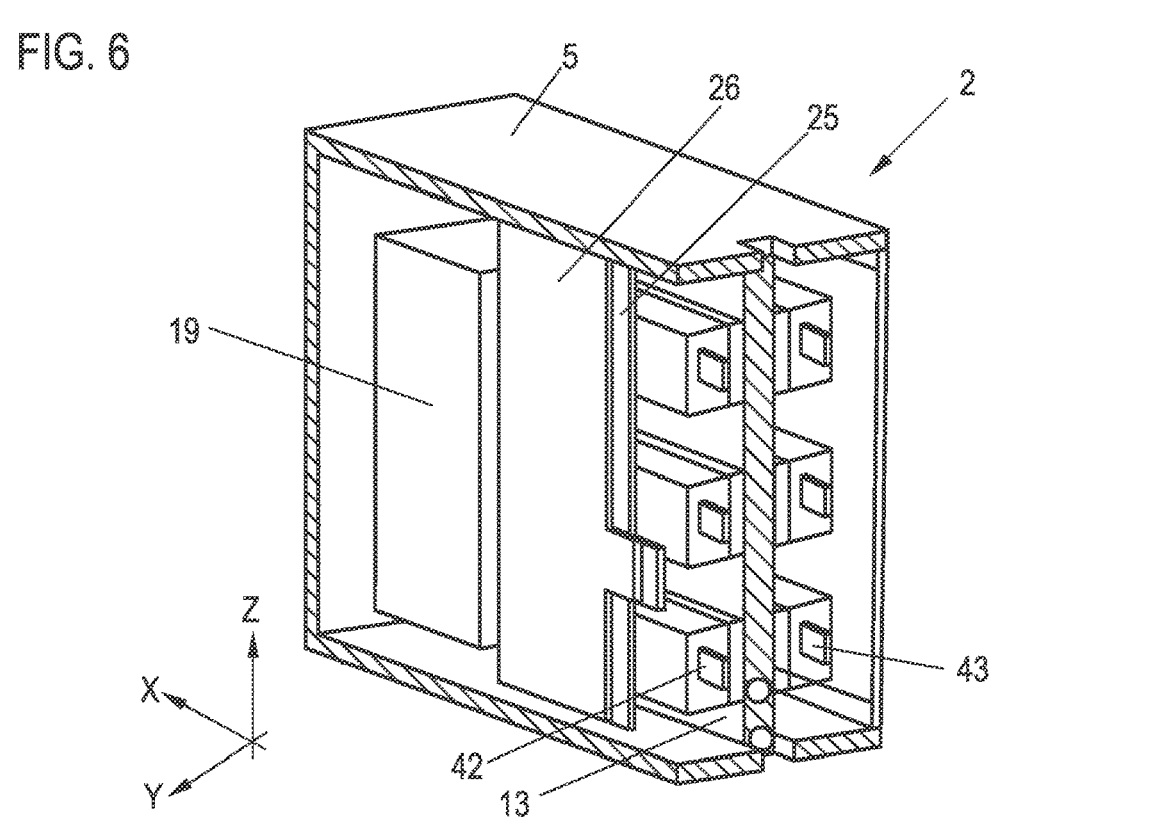
FIG. 6 shows a partially sectioned view of the first chamber of an electrical circuit arrangement.
Figure 7:
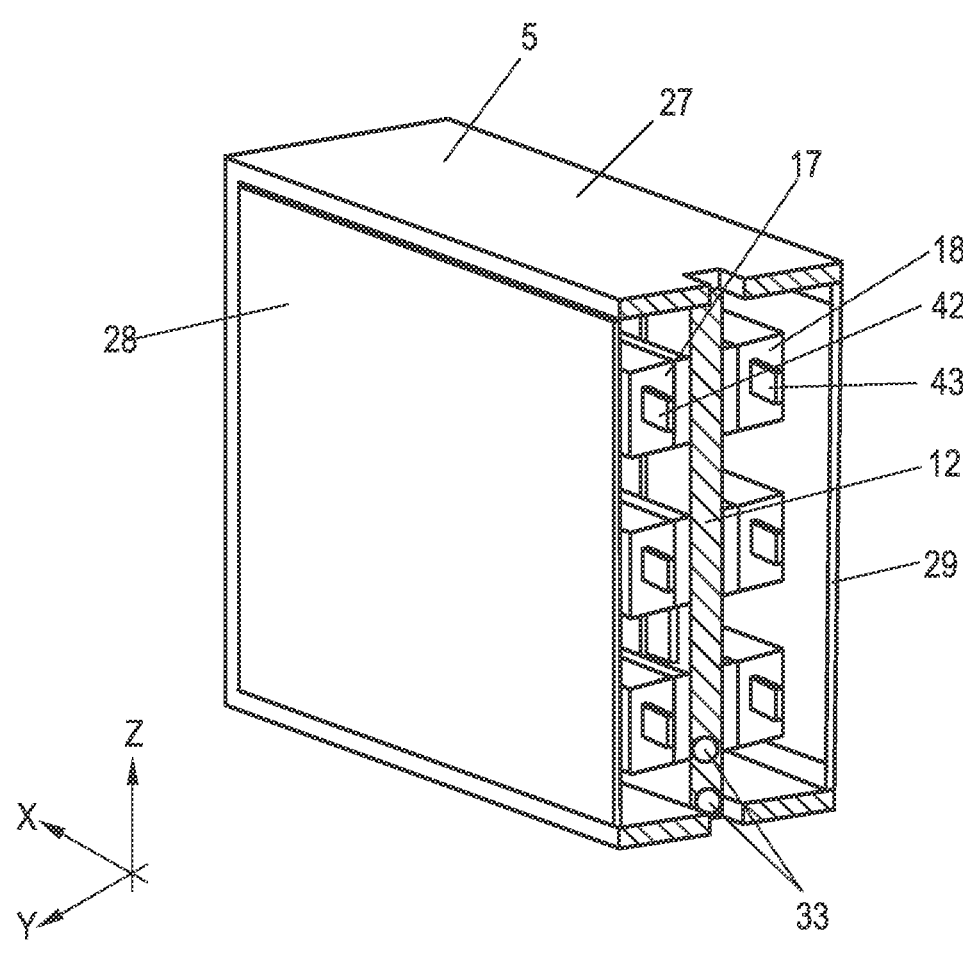
FIG. 7 shows a perspective side view of the partially sectioned housing of the electrical circuit arrangement.

FIG. 6 shows a further, partially sectioned perspective view of the electrical circuit arrangement 2. The housing 5 is again shown cut on the front side. Furthermore, the first housing cover 28 is not shown, so that in particular the interior of the first chamber 13 and the components arranged there can be seen. In FIG. 7, the housing 5 is shown with the first housing cover 28 attached.

Figure 8:
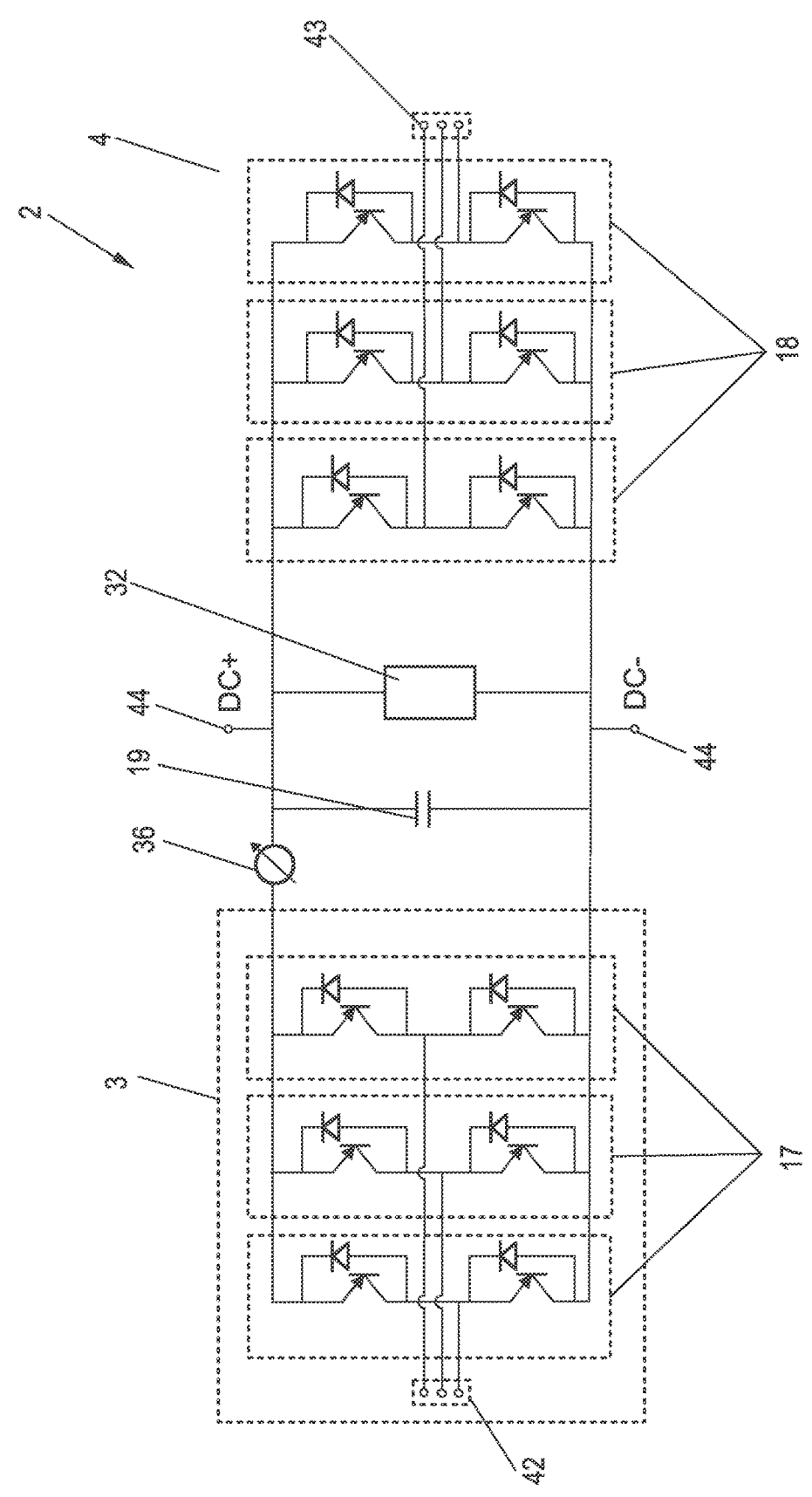
FIG. 8 shows a circuit diagram of the electrical circuit arrangement.

FIG. 8 shows a schematic circuit diagram of the electrical circuit arrangement 2. The first inverter 3 and the second inverter 4 are each designed as three-phase B6 bridge rectifiers. The power modules 17 of the first inverter 3 and the power modules 18 of the second inverter 4 each comprise a half bridge formed from two switching elements. The switching elements are each designed as a transistor.

The direct current sides of the inverters 3, 4 are connected to the capacitor 19, the direct current sensor 36 and the filter circuit 32. The capacitor 19 and the filter circuit 32 are each arranged in parallel to the direct current-side inputs of the inverters 3, 4. The alternating current-side contacts 42 and 43 can, as described above, be connected to the electrical machines 6, 7 in order to operate them via direct current, for example. The contacts schematically labeled DC$^+$ and DC$^-$ are connected to the connection 44 and can be connected, for example, to an electrical energy storage device, in particular a traction battery.

It is possible that the components of the electrical circuit arrangement 2 arranged in the first chamber 13 are at least partially arranged in the second chamber 14 and/or that the components arranged in the second chamber 14 are at least partially arranged in the first chamber 13. A different distribution of the components between the first chamber 13 and the second chamber 14 is also possible. In particular, the capacitor 19 and/or the filter circuit 32 can also be arranged partially in the first chamber 13 and in the second chamber 14.

LIST OF REFERENCE SIGNS

1 Drive arrangement
2 Circuit arrangement
3 Inverter
4 Inverter
5 Housing
6 Electrical machine
7 Electrical machine
8 Gear unit
9 Gear unit
10 Shaft
11 Shaft
12 Plate section
13 Chamber
14 Chamber
15 Side
16 Side
17 Power module
18 Power module
19 Capacitor
20 Connection
21 Connection
22 Connection
23 Busbars 24 Opening
25 Control unit
26 Control unit
27 Section
28 Housing cover
29 Housing cover
30 Control circuit
31 Control circuit
32 Filter circuit
33 Cooling channel
34 Heat sink
35 Opening
36 Direct current sensor
37 Opening
38 Inlet
39 Area
40 Outlet
41 Cooling channel section
42 Alternating current-side contact
43 Alternating current-side contact
44 Connection
45 Section
46 Section

The invention claimed is:

1. An electrical circuit arrangement, comprising:
a first inverter;
a second inverter; and
a housing with a plate section extending in an interior of the housing, wherein the plate section divides the interior of the housing into a first chamber and a second chamber;
wherein a first side of the plate section at least partially delimits the first chamber, and a second side, situated opposite the first side, of the plate section at least partially delimits the second chamber;
wherein the first inverter and the second inverter each include a power module, the power module of the first inverter is arranged on the first side of the plate section, and the power module of the second inverter is arranged on the second side of the plate section;
wherein a first direct current side of the first inverter and a second direct current side of the second inverter are connected to a capacitor arranged in the first chamber; and
wherein the capacitor is connected to the second direct current side of the second inverter via a busbar, wherein the busbar extends through an opening in the plate section.

2. The electrical circuit arrangement according to claim 1, wherein the plate section has a cooling channel extending in an interior of the plate section.

3. The electrical circuit arrangement according to claim 2, wherein the power modules each have a heat sink arranged on the plate section, wherein a cooling medium is supplied to the heat sinks via the cooling channel.

4. The electrical circuit arrangement according to claim 1, wherein the busbar is designed as a laminated busbar comprising a plurality of conductive sheets.

5. The electrical circuit arrangement according to claim 1, wherein the first direct current side of the first inverter and the second direct current side of the second inverter are connected to a filter circuit arranged in the second chamber.

6. The electrical circuit arrangement according to claim 5, wherein a shielding element is arranged between the filter circuit and the power module of the second inverter.

7. The electrical circuit arrangement according to claim 1, wherein a first control device is arranged in the first chamber, and a second control device is arranged in the second chamber, wherein the first control device is designed to control at least one of the first inverter and a component connected to the first inverter, and the second control device is designed to control at least one of the second inverter and a component connected to the second inverter.

8. An electrical drive arrangement, comprising:
a first electrical machine;
a second electrical machine; and
an electrical circuit arrangement including:
a first inverter;
a second inverter; and
a housing with a plate section extending in an interior of the housing, wherein the plate section divides the interior of the housing into a first chamber and a second chamber;
wherein the first inverter and the second inverter each include a power module, the power module of the first inverter is arranged on the plate section in the first chamber, and the power module of the second inverter is arranged on the plate section in the second chamber;
wherein the first electrical machine and the second electrical machine are attached in a load-bearing manner to the housing of the electrical circuit arrangement-;
wherein direct current sides of the first inverter and of the second inverter are connected to a capacitor arranged in the first chamber; and
wherein the capacitor is connected to the direct current side of the second inverter via a busbar, wherein the busbar extends through an opening in the plate section.

9. The electrical drive arrangement according to claim 8, wherein the plate section has a cooling channel extending in an interior of the plate section.

10. The electrical drive arrangement according to claim 9, wherein the power modules each have a heat sink arranged on the plate section, wherein a cooling medium is supplied to the heat sinks via the cooling channel.

11. The electrical drive arrangement according to claim 8, wherein the busbar is designed as a laminated busbar comprising a plurality of conductive sheets.

12. The electrical drive arrangement according to claim 8, wherein direct current sides of the first inverter and the second inverter are connected to a filter circuit arranged in the second chamber.

13. The electrical drive arrangement according to claim 12, wherein a shielding element is arranged between the filter circuit and the power module of the second inverter.

14. An electrical drive arrangement, comprising:
a first electrical machine;
a second electrical machine; and
an electrical circuit arrangement including:
a first inverter;
a second inverter; and
a housing with a plate section extending in an interior of the housing, wherein the plate section divides the interior of the housing into a first chamber and a second chamber;
wherein the first inverter and the second inverter each include a power module, the power module of the first inverter is arranged on the plate section in the first chamber, and the power module of the second inverter is arranged on the plate section in the second chamber;
wherein the first electrical machine and the second electrical machine are attached in a load-bearing manner to the housing of the electrical circuit arrangement;

wherein direct current sides of the first inverter and the second inverter are connected to a filter circuit arranged in the second chamber; and wherein the filter circuit is connected to the direct current side of the first inverter via a busbar, wherein the busbar extends through an opening in the plate section.

15. The electrical drive arrangement according to claim 8, wherein a first control device is arranged in the first chamber, and a second control device is arranged in the second chamber, wherein the first control device is designed to control at least one of the first inverter and a component connected to the first inverter, and the second control device is designed to control at least one of the second inverter and a component connected to the second inverter.

16. An electrical circuit arrangement, comprising:

a first inverter;

a second inverter; and a housing with a plate section extending in an interior of the housing, wherein the plate section divides the interior of the housing into a first chamber and a second chamber;

wherein a first side of the plate section at least partially delimits the first chamber, and a second side, situated opposite the first side, of the plate section at least partially delimits the second chamber;

wherein the first inverter and the second inverter each include a power module, the power module of the first inverter is arranged on the first side of the plate section, and the power module of the second inverter is arranged on the second side of the plate section;

wherein a first direct current side of the first inverter and a second direct current side of the second inverter are connected to a filter circuit arranged in the second chamber; and wherein the filter circuit is connected to the direct current side of the first inverter via a busbar, wherein the busbar extends through an opening in the plate section.

\* \* \* \* \*